US011425627B2

(12) United States Patent
Berliner et al.

(10) Patent No.: US 11,425,627 B2
(45) Date of Patent: Aug. 23, 2022

(54) ROUTE-BASED BEAM PROVISIONING

(71) Applicant: QUALCOMM Incorporated, San Diego, CA (US)

(72) Inventors: Ran Berliner, Kfar-Aviv (IL); Guy Wolf, Bosh Haayin (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/947,622

(22) Filed: Aug. 10, 2020

(65) Prior Publication Data

US 2022/0046512 A1 Feb. 10, 2022

(51) Int. Cl.
| *H04W 40/16* | (2009.01) |
| *H04W 8/08* | (2009.01) |
| *H04W 24/10* | (2009.01) |
| *H04W 40/18* | (2009.01) |
| *H04W 72/04* | (2009.01) |

(52) U.S. Cl.
CPC ............. *H04W 40/16* (2013.01); *H04W 8/08* (2013.01); *H04W 24/10* (2013.01); *H04W 40/18* (2013.01); *H04W 72/046* (2013.01)

(58) Field of Classification Search
None
See application file for complete search history.

(56) References Cited

U.S. PATENT DOCUMENTS

| 2015/0264583 | A1* | 9/2015 | Sundstrom ............ H04W 16/28 |
| | | | 342/373 |
| 2016/0234281 | A1* | 8/2016 | Padmanabhan ......... H04W 4/18 |
| 2017/0171792 | A1* | 6/2017 | Axmon .............. H04B 7/18506 |
| 2018/0124766 | A1* | 5/2018 | Nagaraja ............ H04W 36/0094 |
| 2019/0036630 | A1* | 1/2019 | Svennebring ....... H04W 64/006 |
| 2019/0045414 | A1* | 2/2019 | Guerreiro ............ H04B 7/0695 |
| 2019/0053296 | A1* | 2/2019 | Balappanavar ....... H04W 36/32 |
| 2019/0320364 | A1 | 10/2019 | Jeon et al. |
| 2020/0029292 | A1 | 1/2020 | Zou et al. |

OTHER PUBLICATIONS

International Search Report and Written Opinion—PCT/US2021/070951—ISA/EPO—dated Nov. 4, 2021.

* cited by examiner

*Primary Examiner* — Brian S Roberts
(74) *Attorney, Agent, or Firm* — Harrity & Harrity, LLP; Kevin M. Donnelly

(57) ABSTRACT

Various aspects of the present disclosure generally relate to wireless communication. In some aspects, a base station (BS) may determine, for a user equipment (UE) operating in a mobility state, route information. The BS may transmit, to the UE, information identifying a set of beams based at least in part on the route information. The UE may perform a set of neighbor cell measurements, in connection with movement along the predicted route, using the set of beams. Numerous other aspects are provided.

30 Claims, 10 Drawing Sheets

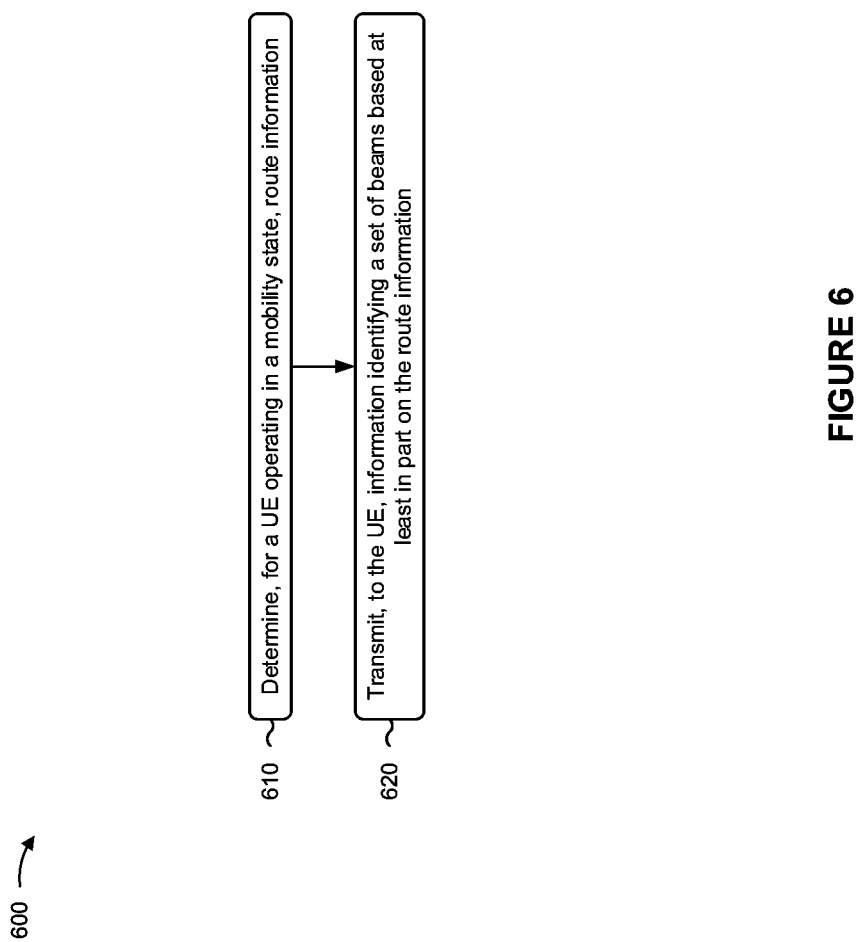

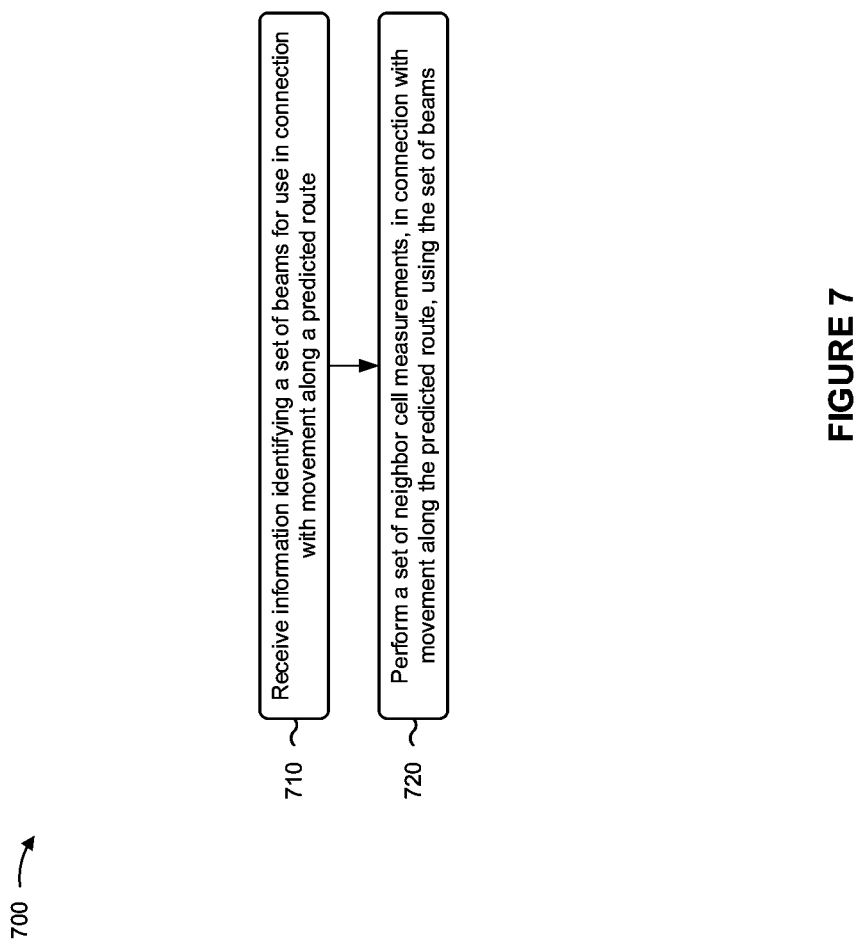

ROUTE-BASED BEAM PROVISIONING

FIELD OF THE DISCLOSURE

Aspects of the present disclosure generally relate to wireless communication and specifically, to techniques and apparatuses for route-based beam provisioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A UE may perform a set of measurements and report the set of measurements to a BS when using a cell provided by the BS. For example, the BS may configure a radio resource control (RRC) connected state UE with a measurement configuration and the UE may perform a set of measurements in accordance with the measurement configuration. The measurement configuration may include a measurement objects list identifying one or more measurement objects on which the UE is to perform one or more measurements. For example, a measurement object may include a frequency location, a time location, a subcarrier spacing, among other examples of a reference signal that the UE is to measure. In some cases, the measurement configuration may include a list of cell specific offsets to use in measuring a signal on a cell. In some cases, the measurement configuration may include a list of 'blacklisted' cells that a UE is not to evaluate and on which the UE is not to report.

Further, the measurement configuration may include a list of 'whitelisted' cells that the UE is to specifically evaluate and on which the UE is to report. By providing information identifying the list of whitelisted cells, the BS may ensure that the UE performs a more efficient measurement procedure. For example, the UE is more likely to detect and measure an identified cell (with identified parameters) than when the UE performs blind detection of cells. Moreover, the UE may save power resources by performing a shorter neighbor cell search procedure than when the UE performs blind detection of cells. However, when the UE is operating in a mobility state, cells that are available to the UE may change as the UE moves from a first location to a second location. For example, whitelisted cells in the first location may not be present in the second location, which may result in the UE falling back to a blind detection procedure to perform a neighbor cell search and report measurements on detected cells.

SUMMARY

In some aspects, a method of wireless communication performed by a base station (BS) includes determining, for a user equipment (UE) operating in a mobility state, route information. The method includes transmitting, to the UE, information identifying a set of beams based at least in part on the route information.

In some aspects, a method of wireless communication performed by a UE includes receiving information identifying a set of beams for use in connection with movement along a predicted route. The method includes performing a set of neighbor cell measurements, in connection with movement along the predicted route, using the set of beams.

In some aspects, a BS for wireless communication includes a memory; and one or more processors operatively coupled to the memory, the memory and the one or more processors configured to determine, for a user equipment (UE) operating in a mobility state, route information. The memory and the one or more processors may be configured to transmit, to the UE, information identifying a set of beams based at least in part on the route information.

In some aspects, a UE for wireless communication includes a memory; and one or more processors operatively coupled to the memory, the memory and the one or more processors configured to receive information identifying a set of beams for use in connection with movement along a predicted route. The memory and the one or more processors may be configured to perform a set of neighbor cell measurements, in connection with movement along the predicted route, using the set of beams.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a flowchart illustrating an example process performed, for example, by a BS in accordance with various aspects of the present disclosure.

FIG. 7 is a flowchart illustrating an example process performed, for example, by a UE in accordance with various aspects of the present disclosure.

DETAILED DESCRIPTION

Figure 1:
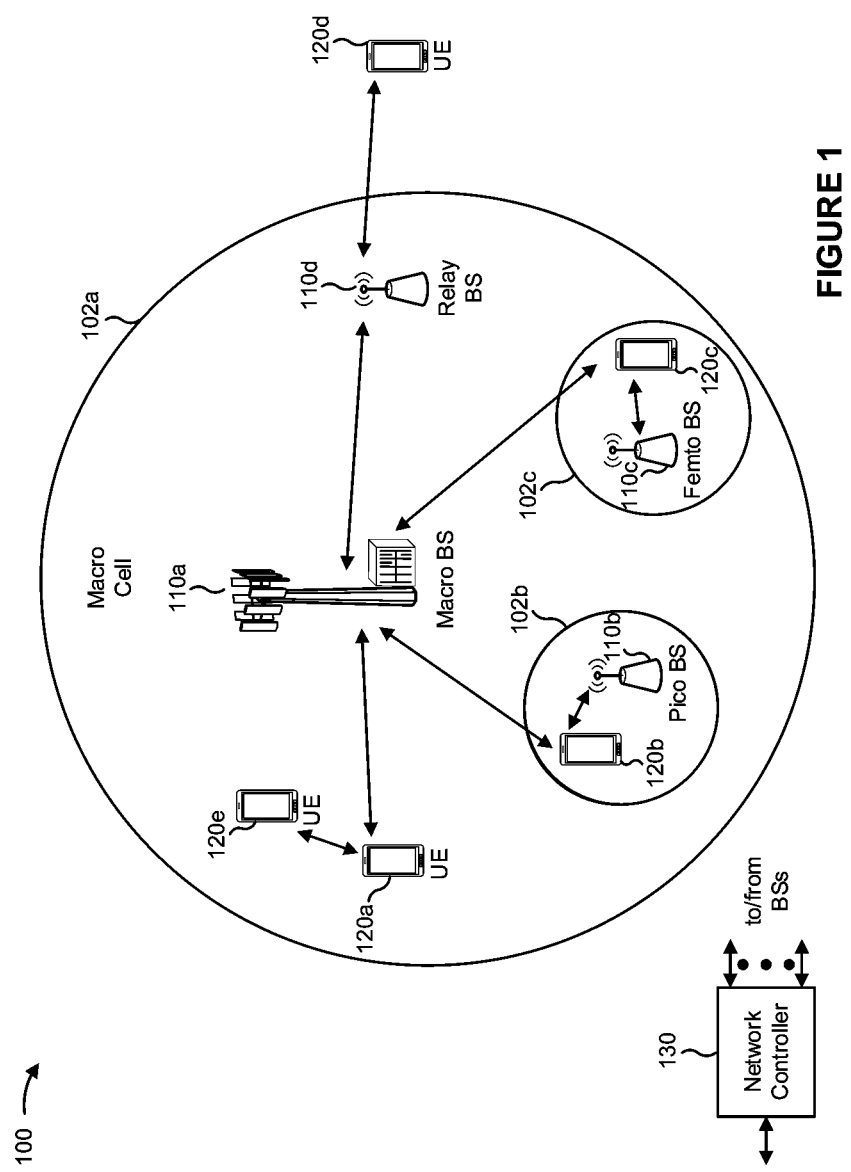
FIG. 1 is a diagram illustrating an example of a wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to route-based beam provisioning. Some aspects more specifically relate to predicting a route of a mobile UE and providing route information identifying a set of beams along the predicted route to enable the UE to perform an efficient neighbor cell measurement and reporting procedure. In some aspects, a BS may predict a mobility (such as a speed) of the UE and a direction of the UE based at least in part on sensor data obtained from the UE, from sensors collocated with the BS, from other connected devices, among other examples. In some aspects, the BS may communicate with other BSs to identify a set of beams along a predicted route of the UE and providing provisioning information including a whitelist that identifies the set of beams.

Particular aspects of the subject matter described in this disclosure can be implemented to realize one or more of the following potential advantages. In some examples, the described techniques can be used to increase a likelihood of detection of a beam during a neighbor cell search procedure. In some examples, the described techniques can be used to reduce a length and an associated power consumption of a neighbor cell search procedure.

FIG. 1 is a diagram illustrating an example of a wireless network in accordance with various aspects of the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

In some aspects, a BS may include integrated or co-located sensor elements, such as a camera, a radar, a positioning units (such as for a mobile BS to use in determining a current position). Moreover, the BSs may communicate with other BSs that include sensor elements or with other devices, such as machine-type communication (MTC) devices, that are deployed within a cell.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered MTC or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing 284 that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. Some network deployments, such as FR2 deployments, may have relatively small cell ranges compared with other communication bands. For example, relative to FR1 deployments, FR2 deployments may have smaller cells. The frequencies included in FR1 and FR2 may be modified, and techniques described herein are applicable to those modified frequency ranges.

Figure 2:
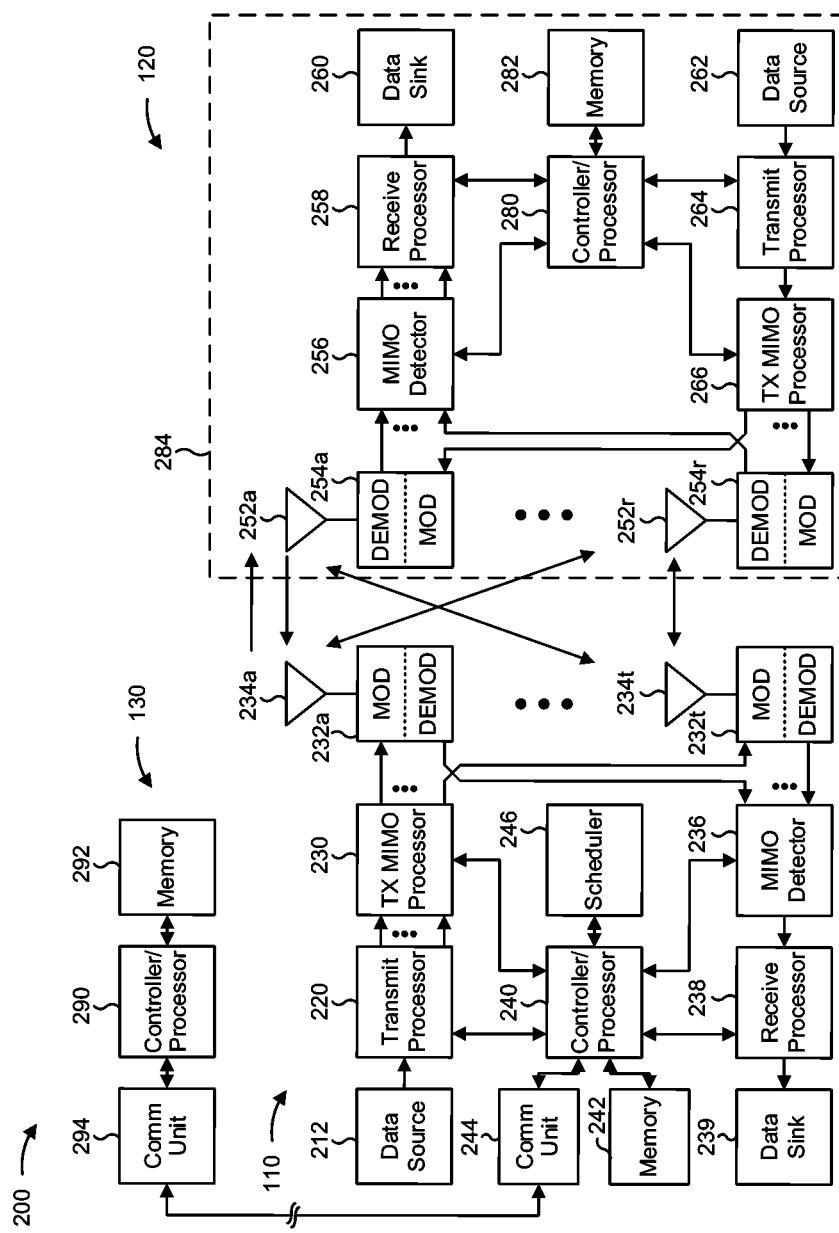
FIG. 2 is a diagram illustrating an example base station (BS) in communication with a user equipment (UE) in a wireless network in accordance with various aspects of the present disclosure.

FIG. 2 is a diagram illustrating an example base station in communication with a UE in a wireless network in accordance with various aspects of the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), or a channel quality indicator (CQI), among other examples, or combinations thereof.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with route-based beam provisioning, as described in more detail elsewhere herein. For example, controller/processor 240 of base station 110, controller/processor 280 of UE 120, or any other component(s) of FIG. 2 may perform or direct operations of, for example, process 600 of FIG. 6, process 700 of FIG. 7, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some aspects, executing instructions may include running the instructions, converting the instructions, compiling the instructions, or interpreting the instructions, among other examples.

In some aspects, UE 120 may include means for receiving information identifying a set of beams for use in connection with movement along a predicted route, means for performing a set of neighbor cell measurements, in connection with movement along the predicted route, using the set of beams, among other examples, or combinations thereof. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

In some aspects, base station 110 may include means for determining, for a UE operating in a mobility state, route information, means for transmitting, to the UE, information identifying a set of beams based at least in part on the route information, among other examples, or combinations thereof. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

Figure 3:
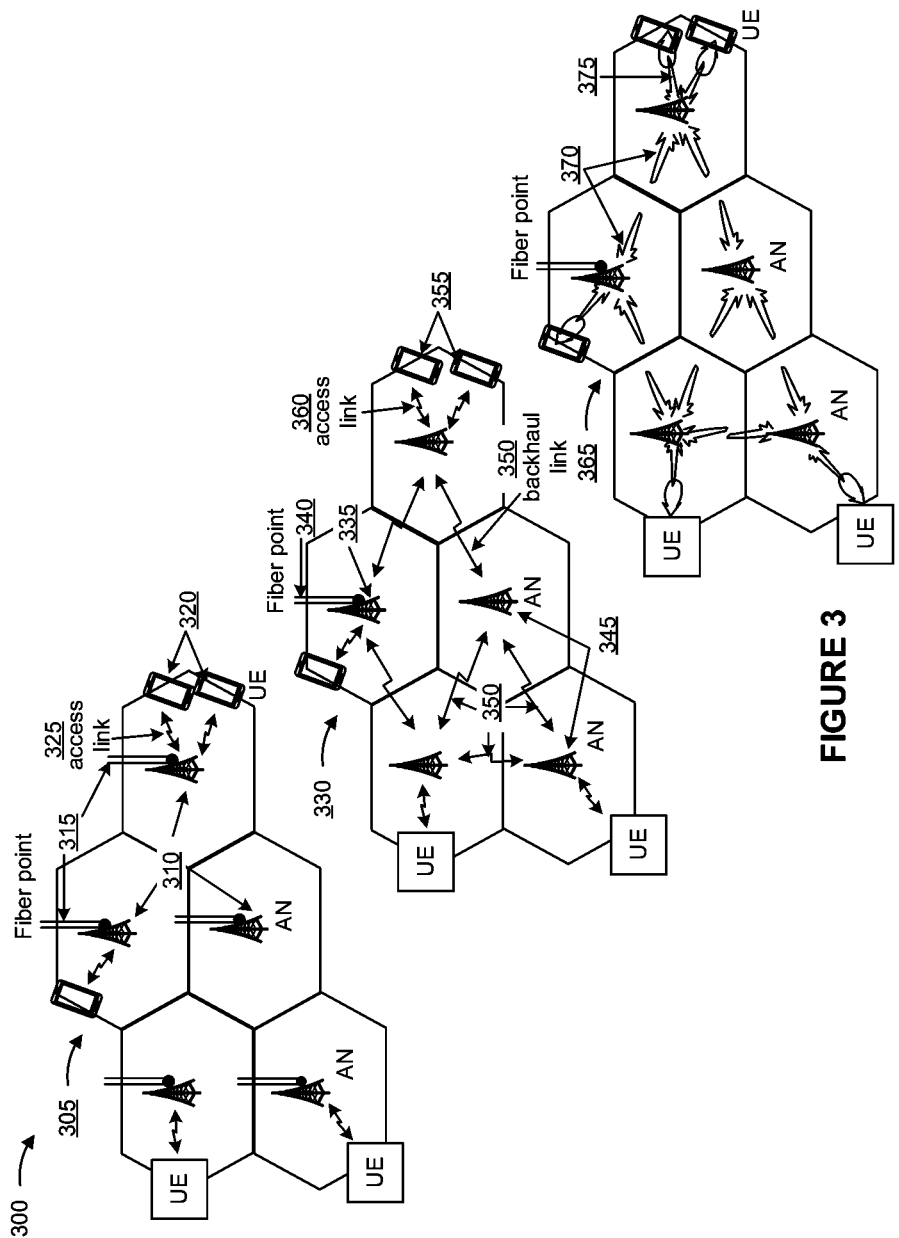
FIG. 3 is a diagram illustrating an example of radio access networks in accordance with various aspects of the present disclosure.

FIG. 3 is a diagram illustrating examples 300 of radio access networks, in accordance with various aspects of the disclosure.

At 305, a traditional (such as 3G, 4G, LTE) radio access network may include multiple base stations 310 (such as access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

At 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (such as via one or more non-anchor base stations 345) to form a backhaul path to the core network for carrying backhaul traffic. Backhaul link 350 may be a wireless link. Anchor base station(s) 335 or non anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

At 365, in some aspects, a radio access network that includes an IAB network may utilize millimeter wave technology or directional communications (such as beamforming) for communications between base stations or UEs (such as between two base stations, between two UEs, or between a base station and a UE). For example, wireless backhaul links 370 between base stations may use millimeter wave signals to carry information or may be directed toward a target base station using beamforming among other examples. Similarly, the wireless access links 375 between a UE and a base station may use millimeter wave signals or may be directed toward a target wireless node (such as a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (such as a peer-to-peer network or a device-to-device network). In such examples, an anchor node may refer to a UE that is directly in communication with a base station (such as an anchor base station or a non-anchor base station).

Figure 4:
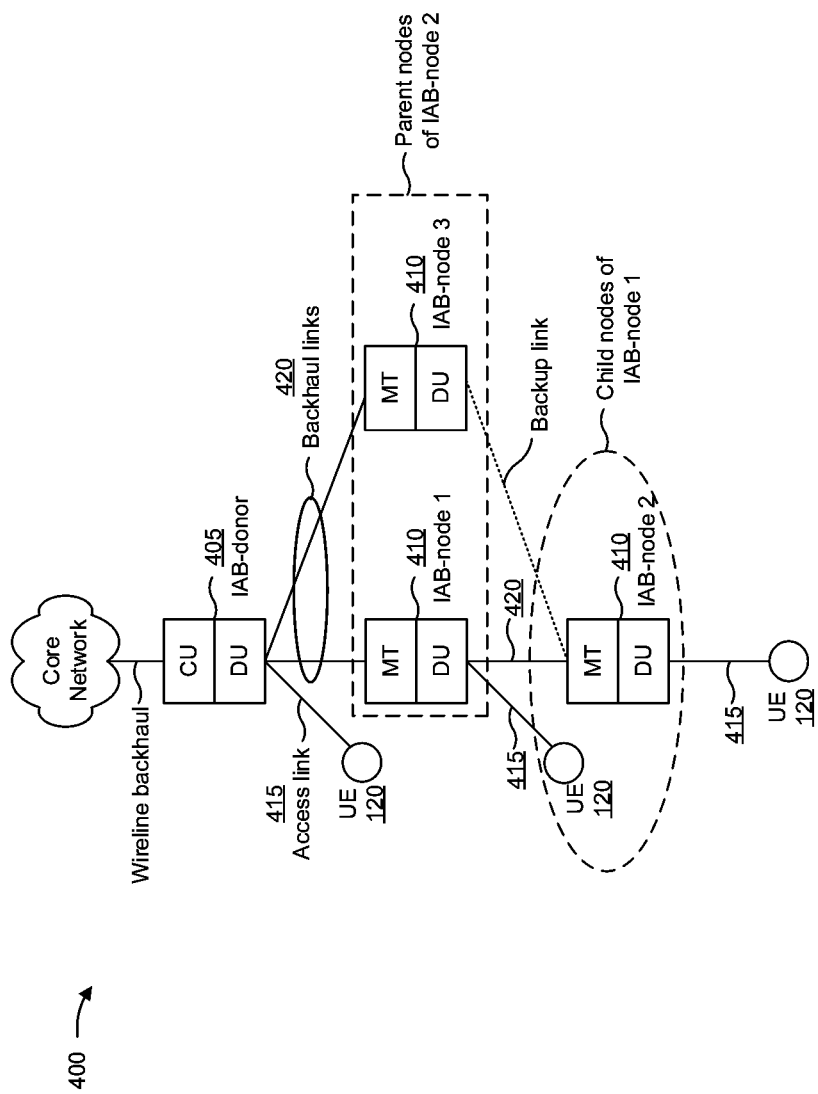
FIG. 4 is a diagram illustrating an example of an IAB network architecture in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, among other examples. The CU may configure a distributed unit (DU) of the IAB donor 405 or may configure one or more IAB nodes 410 (such as an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (such as a radio resource control (RRC) configuration message, an F1 application protocol (F1AP) message, among other examples).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (such as a child node) may be controlled or scheduled by another IAB node 410 (such as a parent node of the child node) or by an IAB donor 405. The DU functions of an IAB node 410 (such as a parent node) may control or schedule other IAB nodes 410 (such as child nodes of the parent node) or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, or schedule communications of IAB nodes 410 or UEs 120. A UE 120 may include only MT functions, and not DU functions. That is, communications of a UE 120 may be controlled or scheduled by an IAB donor 405 or an IAB node 410 (such as a parent node of the UE 120).

When a first node controls or schedules communications for a second node (such as when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an IAB node 410, and a child node may be an IAB node 410 or a UE 120. Communications of an MT function of a child node may be controlled or scheduled by a parent node of the child node.

As further shown in FIG. 4, a link between a UE 120 (such as which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (such as time resources, frequency resources, spatial resources, or the like) may be shared between access links 415 and backhaul links 420. In some aspects, a backhaul link 420 may be a primary backhaul link or a secondary backhaul link (such as a backup backhaul link). In some aspects, a secondary backhaul link may be used if a primary backhaul link fails, becomes congested, becomes overloaded, or the like. For example, a backup link between IAB-node 2 and IAB-node 3 may be used for backhaul communications if a primary backhaul link between IAB-node 2 and IAB-node 1 fails. As used herein, a node or a wireless node may refer to an IAB donor 405 or an IAB node 410.

As described above, a UE may perform a set of measurements and report the set of measurements to a BS when using a cell provided by the BS. The UE may perform a set of measurements in accordance with the measurement configuration, which may include a measurement objects list identifying one or more measurement objects on which the UE is to perform one or more measurements. A measurement object may include a frequency location, a time location, a subcarrier spacing, among other examples of a reference signal that the UE is to measure. In some cases, the measurement configuration may include a list of cell specific offsets to use in measuring a signal on a cell. In some cases, the measurement configuration may include a list of 'blacklisted' cells that a UE is not to evaluate.

Further, the measurement configuration may include a list of 'whitelisted' cells that the UE is to specifically evaluate and on which the UE is to report. By providing information identifying the list of whitelisted cells, the BS may ensure that the UE performs a more efficient measurement procedure. For example, the UE is more likely to detect and measure an identified cell (with identified parameters) that when the UE performs blind detection of cells. However, when a UE is operating in a mobility state, such as a UE that is being used by a user traveling in a vehicle, a UE that is a communication unit for a vehicle, among other examples, cells that the UE is to measure may change over time. As a result, a static whitelist of cells to measure at a particular location may only be usable or a brief period of time when the UE is at the particular location.

Various aspects relate generally to route based beam provisioning. Some aspects more specifically relate to a BS determining route information for a UE, such as a predicted mobility, a predicted direction, among other examples, and generating a beam list for the UE based at least in part on the route information. In some aspects, BS may identify a set of beams along a predicted route of the UE and provide a beam list (a whitelist) that includes the set of beams to enable the UE to perform beam measurements on beams of the beam list while the UE is traveling along the predicted route.

Particular aspects of the subject matter described in this disclosure can be implemented to realize one or more of the following potential advantages. In some examples, the described techniques can be used to increase a likelihood of detection of a beam during a neighbor cell search procedure. In some examples, the described techniques can be used to reduce a length and an associated power consumption of a neighbor cell search procedure.

Figure 5A:
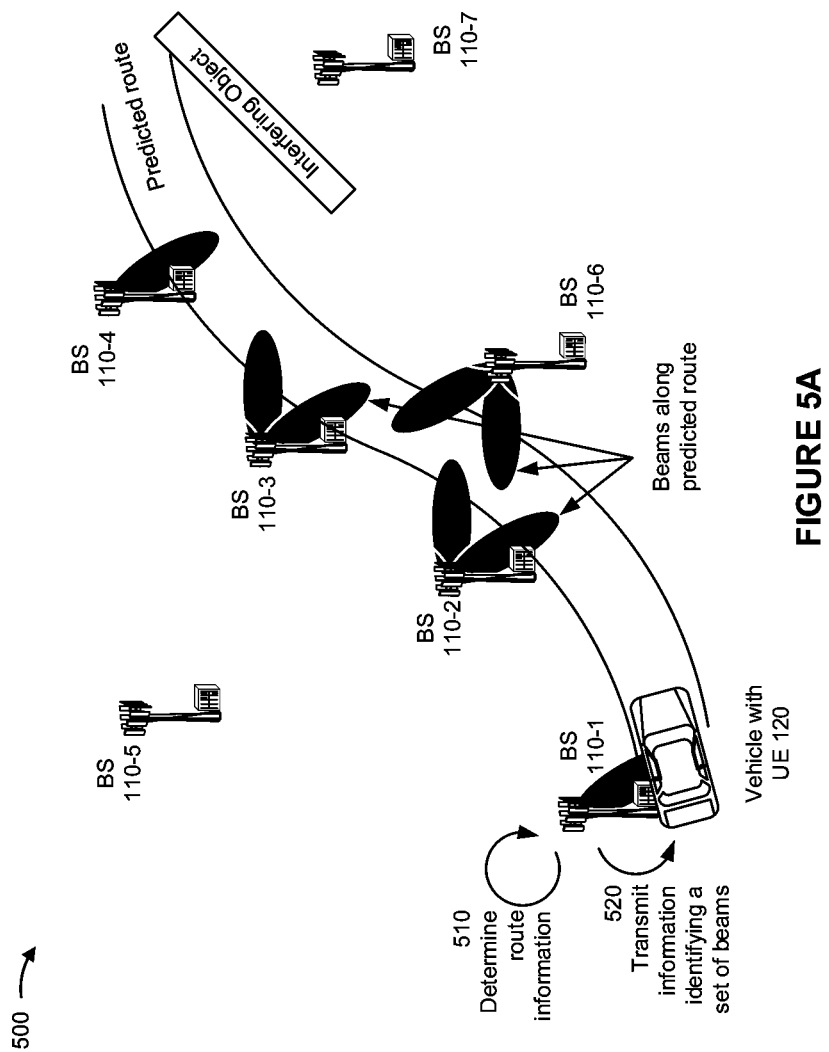
FIGS. 5A-5B are diagrams illustrating examples associated with route-based beam provisioning in accordance with various aspects of the present disclosure.
Figure 5B:
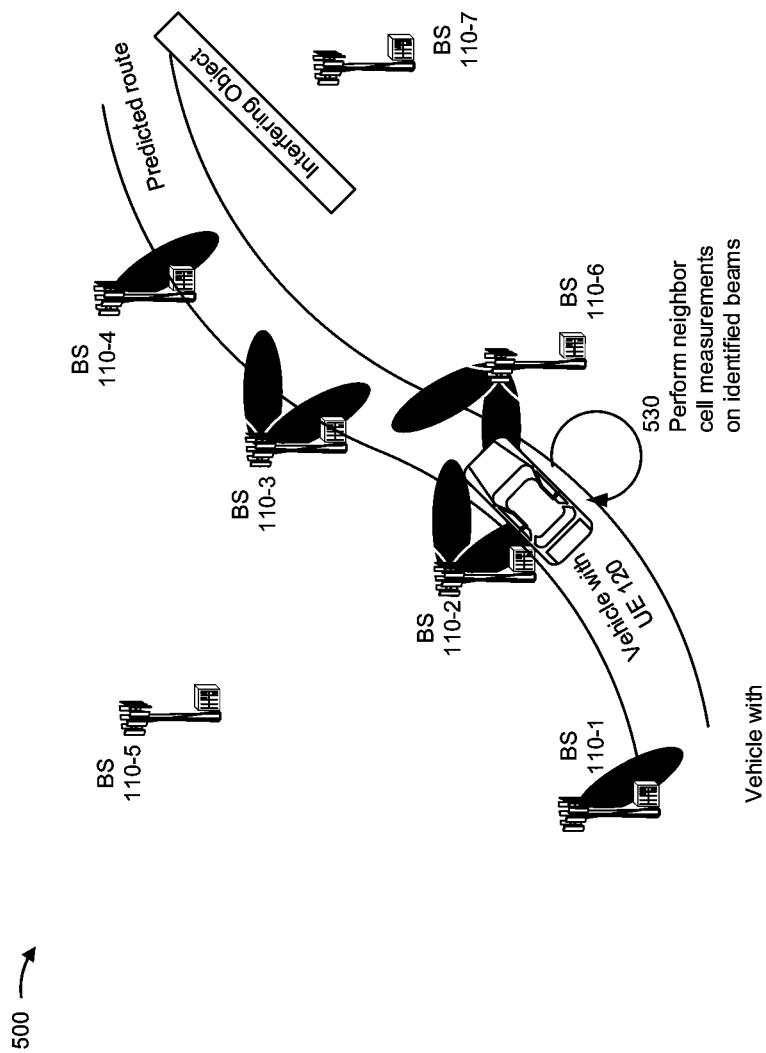

FIGS. 5A and 5B are diagrams illustrating an example 500 associated with route-based beam provisioning, in accordance with various aspects of the present disclosure. As shown in FIGS. 5A and 5B, example 500 includes communication between a set of BSs 110 and a UE 120. In some aspects, the set of BSs 110 and the UE 120 may be included in a wireless network, such as wireless network 100. The set of BSs 110 and UE 120 may communicate on a wireless access link, which may include an uplink and a downlink. In some aspects, UE 120 may be operating within a vehicle (or may be a component of a vehicle). Although some aspects are described in terms of UE 120 operating within a vehicle, other mobility modes may be possible, such as a pedestrian-operated UE 120 among other examples.

As further shown in FIG. 5A, and in a first operation 510, a BS 110-1 may determine route information for a UE 120. For example, BS 110-1 may determine a predicted route, which may include a predicted mobility (speed), a predicted direction, among other examples, for UE 120. In some aspects, BS 110-1 may determine the predicted route based at least in part on one or more sensor measurements. For example, BS 110-1 may perform one or more sensor measurements using one or more integrated sensors or may receive information from another device. In such examples, the BS 110-1 may receive the information from another BS, the UE 120, another UE, a sensor device, among other examples.

In some aspects, BS 110-1 may determine a set of beams for a beam list (a whitelist) that UE 120 is to use for neighbor cell measurements. For example, BS 110-1 may obtain information identifying a deployment configuration associated with one or more neighbor cells, such as identifying a location of a neighboring BS. Additionally or alternatively, BS 110-1 may obtain information identifying a cell range of a neighboring BS. Additionally or alternatively, BS 110-1 may obtain information identifying an interfering object in proximity to a neighboring BS. Additionally or alternatively, BS 110-1 may obtain information identifying a beam coverage of a neighboring BS. In some aspects, BS 110-1 may obtain information associated with a configuration of a mobile BS, such as information identifying a route of the mobile BS among other examples. In some aspects, BS 110-1 may determine a current location of a mobile BS, a future location of a mobile BS, a predicted future location of a mobile BS, among other examples to identify one or more beams for the set of beams. In such examples, based at least in part on the information associated with a one or more neighbor cells or a mobile BS and the predicted route, BS 110-1 may select a set of beams that cover the predicted route and that UE 120 may use for neighbor cell measurements and connectivity when traveling along the predicted route. In some aspects, BS 110-1 may select BSs about which to determine a deployment configuration based at least in part on the predicted route.

As further shown in FIG. 5A, and in a second operation 520, BS 110-1 may transmit information identifying a set of beams. For example, BS 110-1 may transmit a measurement object including a whitelist of beams for UE 120 to use along the predicted route. In some aspects, BS 110-1 may perform a measurement object update with UE 120 to provide the information identifying the set of beams. For example, when BS 110-1 is a serving cell of UE 120, BS 110-1 may use the measurement object update procedure to provide a new measurement object that includes the information identifying the set of beams as a whitelist of the measurement object. Additionally or alternatively, when BS 110-1 is not the serving cell of UE 120, BS 110-1 may convey the information identifying the set of beams, via an inter-cell X2 interface, to another BS to relay to UE 120. In some aspects, BS 110-1 may provide other information to UE 120, such as a blacklist of a set of beams to avoid performing neighbor cell measurements or other measurement object information.

As further shown in FIG. 5B, and in a third operation 530, UE 120 may perform neighbor cell measurements on identified beams. For example, UE 120 may use the whitelist of beams to perform neighbor cell measurements on beams of, for example, BS 110-2 and BS 110-6 at a particular location along the predicted route. In some aspects, UE 120 may attempt to detect a beam using the identified beams. For example, at a particular location along the predicted route, UE 120 may attempt to perform a neighbor cell measurement procedure to ensure connectivity to a network and may attempt to detect a beam identified by BS 110-1 during the neighbor cell measurement procedure. Additionally or alternatively, UE 120 may forgo attempting to detect a beam on a blacklist provided by BS 110-1. In some aspects, UE 120 may perform a handover based at least in part on a result of the neighbor cell measurement procedure. In some aspects, UE 120 may periodically receive an updated measurement object with a new set of beams based at least in part on a new predicted route. For example, periodically, a BS (such as BS 110-1 or another BS) may determine a new predicted route and may provide a new set of beams based at least in part on the new predicted route.

FIG. 6 is a flowchart illustrating an example process 600 performed, for example, by a base station (BS) in accordance with various aspects of the present disclosure. Example process 600 is an example where the BS (for example, BS 110) performs operations associated with route-based beam provisioning.

As shown in FIG. 6, in some aspects, process 600 may include determining, for a user equipment (UE) operating in a mobility state, route information (block 610). For example, the BS (for example, using transmit processor 220, TX MIMO processor 230, modulator 232, antenna 234, demodulator 232, MIMO detector 236, receive processor 238, controller/processor 240, memory 242, scheduler 246, or another component) may determine, for a user equipment (UE) operating in a mobility state, route information, as described above.

As further shown in FIG. 6, in some aspects, process 600 may include transmitting, to the UE, information identifying a set of beams based at least in part on the route information (block 620). For example, the BS (for example, using transmit processor 220, TX MIMO processor 230, modulator 232, antenna 234, controller/processor 240, memory 242, scheduler 246, or another component) may transmit, to the UE, information identifying a set of beams based at least in part on the route information, as described above.

Process 600 may include additional aspects, such as any single aspect or any combination of aspects described below or in connection with one or more other processes described elsewhere herein.

In a first additional aspect, process 600 includes obtaining a set of sensor measurements, and wherein determining the route information includes determining the route information based at least in part on the set of sensor measurements.

In a second additional aspect, alone or in combination with the first aspect, determining the route information includes determining a predicted mobility and a predicted direction of the UE.

In a third additional aspect, alone or in combination with one or more of the first and second aspects, process 600 includes identifying a deployment configuration for one or more neighboring BSs, and selecting the set of beams based at least in part on the deployment configuration, and wherein transmitting the information identifying the set of beams includes transmitting the information identifying the set of beams based at least in part on selecting the set of beams.

In a fourth additional aspect, alone or in combination with one or more of the first through third aspects, the deployment configuration includes information identifying at least one of a cell location of a neighboring BS of the one or more BSs, a cell range of the neighboring BS, an interference characteristic relating to a cell associated with the neighboring BS, or a beam coverage relating to the cell.

In a fifth additional aspect, alone or in combination with one or more of the first through fourth aspects, transmitting the information identifying the set of beams includes transmitting information identifying a provisioned route beam list that includes information identifying a set of cells and one or more beams in each cell of the set of cells.

In a sixth additional aspect, alone or in combination with one or more of the first through fifth aspects, process 600 includes identifying a configuration for one or more mobile BSs, and selecting the set of beams based at least in part on the configuration, and wherein transmitting the information identifying the set of beams includes transmitting the information identifying the set of beams based at least in part on selecting the set of beams.

In a seventh additional aspect, alone or in combination with one or more of the first through sixth aspects, the configuration includes information identifying at least one of a location of a mobile BS of the one or more mobile BSs, or a beam coverage of the mobile BS.

In an eighth additional aspect, alone or in combination with one or more of the first through seventh aspects, process 600 includes communicating with the UE to perform a measurement object update procedure, and wherein transmitting the information identifying the set of beams includes transmitting the information identifying the set of beams in connection with communicating with the UE to perform the measurement object update procedure.

In an ninth additional aspect, alone or in combination with one or more of the first through eighth aspects, communicating with the UE to perform a measurement object update procedure includes transmitting a measurement object to the UE, and wherein the measurement object includes information identifying at least one of a frequency location on which to monitor for a beam of the set of beams, a time location with which to monitor for the beam, a subcarrier spacing of reference signals to be measured for a beam, a set of cell specific offsets for the set of beams, the set of beams for evaluation, or another set of beams to avoid evaluating.

In a tenth additional aspect, alone or in combination with one or more of the first through ninth aspects, transmitting the information identifying the set of beams includes transmitting, for relay to the UE, the information identifying the set of beams to a serving BS of the UE.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a user equipment (UE) in accordance with various aspects of the present disclosure. Example process 700 is an example where the UE (for example, UE 120) performs operations associated with route-based beam provisioning.

As shown in FIG. 7, in some aspects, process 700 may include receiving information identifying a set of beams for use in connection with movement along a predicted route (block 710). For example, the UE (for example, using antenna 252, demodulator 254, MIMO detector 256, receive processor 258, controller/processor 280, memory 282, or another component) may receive information identifying a set of beams for use in connection with movement along a predicted route, as described above.

As further shown in FIG. 7, in some aspects, process 700 may include performing a set of neighbor cell measurements, in connection with movement along the predicted route, using the set of beams (block 720). For example, the UE (for example, using antenna 252, demodulator 254, MIMO detector 256, receive processor 258, transmit processor 264, TX MIMO processor 266, modulator 254, controller/processor 280, memory 282, or another component) may perform a set of neighbor cell measurements, in connection with movement along the predicted route, using the set of beams, as described above.

Process 700 may include additional aspects, such as any single aspect or any combination of aspects described below or in connection with one or more other processes described elsewhere herein.

In a first additional aspect, process 700 includes transmitting a set of sensor measurements, and wherein receiving the information identifying the set of beams includes receiving the information identifying the set of beams based at least in part on transmitting the set of sensor measurements.

In a second additional aspect, alone or in combination with the first aspect, the predicted route is based at least in part on a predicted mobility and a predicted direction of the UE.

In a third additional aspect, alone or in combination with one or more of the first and second aspects, the set of beams includes at least one of a beam associated with stationary base station, or a beam associated with mobile base station.

In a fourth additional aspect, alone or in combination with one or more of the first through third aspects, the information identifying the set of beams is a provisioned route beam list including information identifying a set of cells and one or more beams in each cell of the set of cells.

In a fifth additional aspect, alone or in combination with one or more of the first through fourth aspects, process 700 includes communicating with a base station to perform a measurement object update procedure, and wherein receiving the information identifying the set of beams includes receiving the information identifying the set of beams in connection with communicating with the base station to perform the measurement object update procedure.

In a sixth additional aspect, alone or in combination with one or more of the first through fifth aspects, receiving the information identifying the set of beams includes receiving, from a serving base station, the information identifying the set of beams relayed from another base station.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
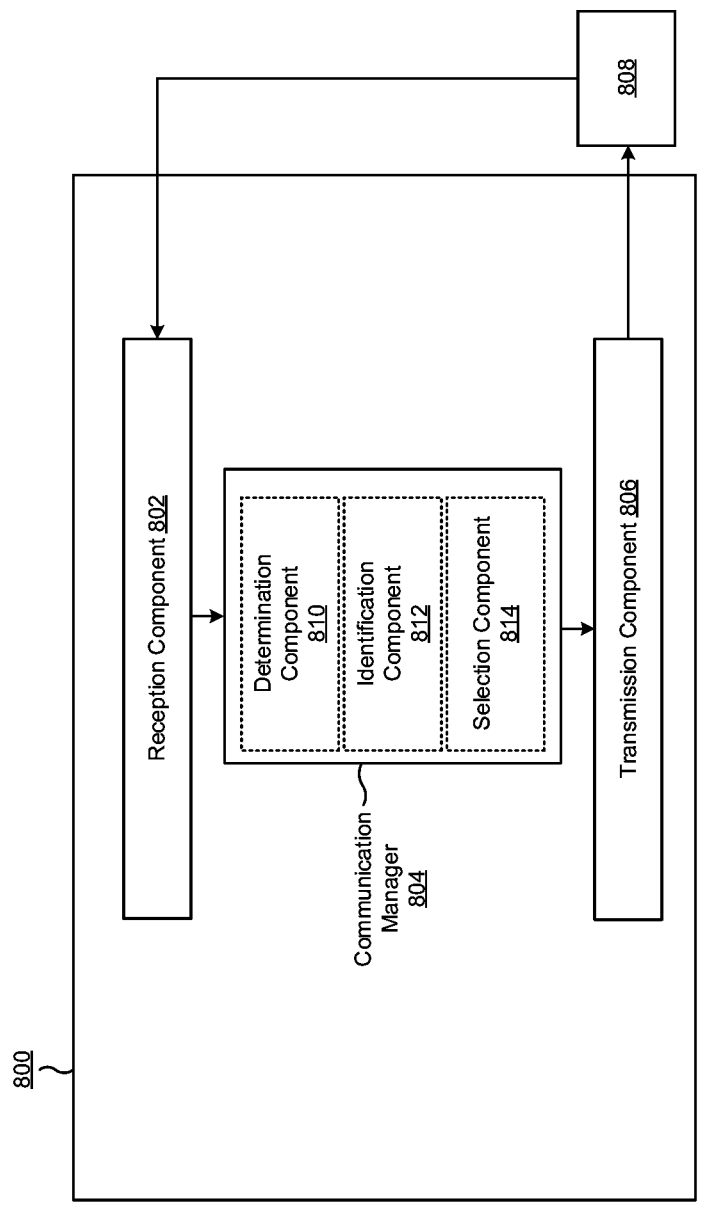
FIGS. 8-9 are block diagrams of example apparatuses for wireless communication in accordance with various aspects of the present disclosure.

FIG. 8 is a block diagram of an example apparatus 800 for wireless communication in accordance with various aspects of the present disclosure. The apparatus 800 may be a BS, or a BS may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 5A-5B. Additionally or alternatively, the apparatus 800 may be configured to perform one or more processes described herein, such as process 600 of FIG. 6 or a combination thereof. In some aspects, the apparatus 800 may include one or more components of the BS described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the BS described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the BS described above in connection with FIG. 2. In some aspects, the transmission component 806 may be co-located with the reception component 802 in a transceiver.

The communication manager 804 may determine route information and may transmit information identifying a set of beams based at least in part on the route information. In some aspects, the communication manager 804 may include a controller/processor, a memory, a scheduler, a communication unit, or a combination thereof, of the BS described above in connection with FIG. 2.

In some aspects, the communication manager 804 may include a set of components, such as a determination component 810, an identification component 812, a selection component 814, or a combination thereof. Alternatively, the set of components may be separate and distinct from the communication manager 804. In some aspects, one or more components of the set of components may include or may be implemented within a controller/processor, a memory, a scheduler, a communication unit, or a combination thereof, of the BS described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 810 may determine route information, such as based at least in part on a set of sensor measurements. The identification component 812 may identify a deployment configuration for one or more neighboring BSs, a configuration of one or more mobile BSs, among other examples. The selection component 814 may select a set of beams based at least in part on a deployment configuration of one or more neighboring BSs, based at least in part on a configuration of one or more mobile BSs, among other examples.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
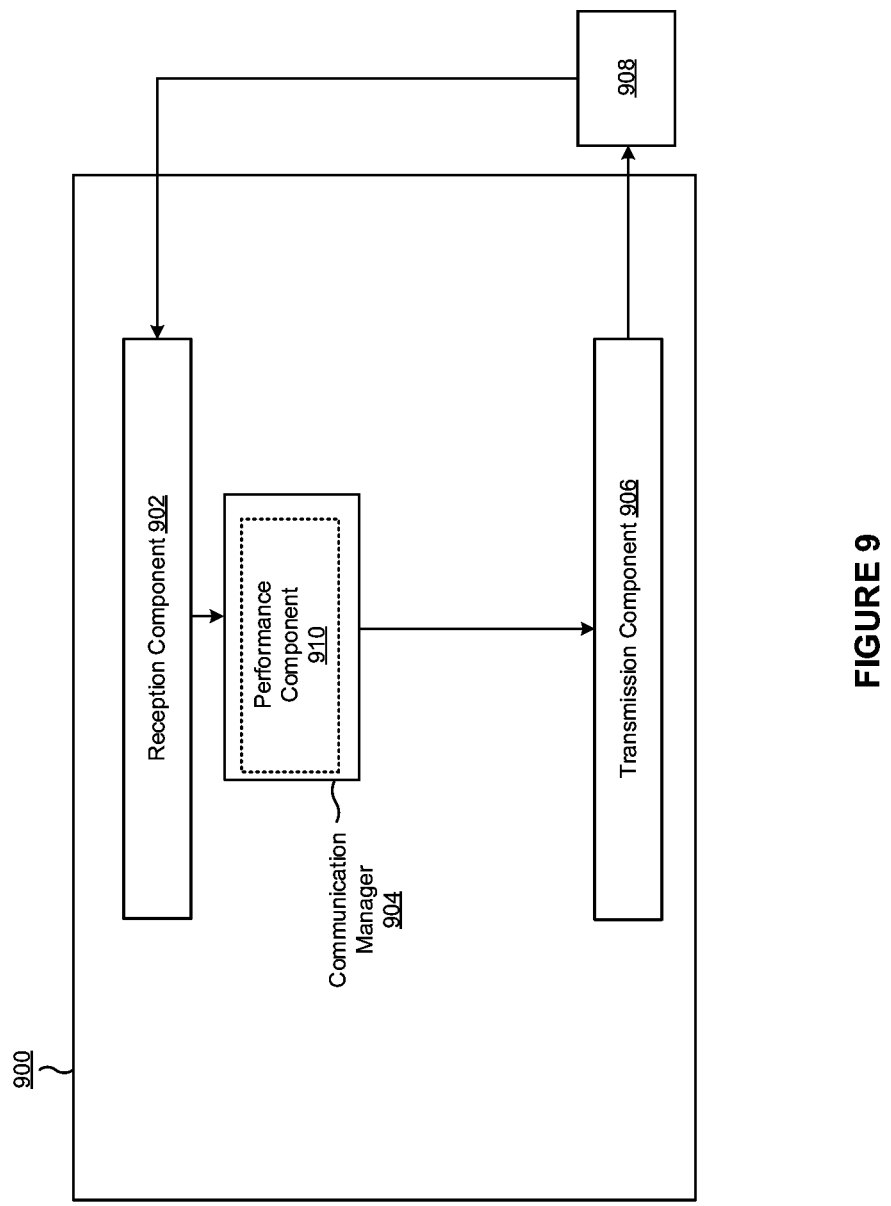

FIG. 9 is a block diagram of an example apparatus 900 for wireless communication in accordance with various aspects of the present disclosure. The apparatus 900 may be a UE, or a UE may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIGS. 5A-5B. Additionally or alternatively, the apparatus 900 may be configured to perform one or more processes described herein, such as process 700 of FIG. 7 or a combination thereof. In some aspects, the apparatus 900 may include one or more components of the UE described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the UE described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the UE described above in connection with FIG. 2. In some aspects, the transmission component 906 may be co-located with the reception component 902 in a transceiver.

The communication manager 904 may receive information identifying a set of beams for use in connection with movement along a predicted route, perform a set of neighbor cell measurements, in connection with movement along the predicted route, using the set of beams, among other examples. In some aspects, the communication manager 904 may include a controller/processor, a memory, a communication unit, or a combination thereof, of the UE described above in connection with FIG. 2.

In some aspects, the communication manager 904 may include a set of components, such as a performance component 910 among other examples. Alternatively, the set of components may be separate and distinct from the communication manager 904. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The performance component 910 may control the reception component 902 or the transmission component 906 to perform a set of neighbor cell measurements using a set of identified beams.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a base station (BS), comprising:
   determining, for a user equipment (UE) operating in a mobility state, route information;
   identifying, based at least in part on the route information, a deployment configuration for one or more neighboring BSs;
   selecting a set of beams based at least in part on the deployment configuration; and
   transmitting, to the UE, information identifying the set of beams based at least in part on selecting the set of beams.

2. The method of claim 1, further comprising:
   obtaining a set of sensor measurements; and
   wherein determining the route information comprises:
      determining the route information based at least in part on the set of sensor measurements.

3. The method of claim 1, wherein determining the route information comprises:
   determining at least one of a predicted route, a predicted mobility, or a predicted direction of the UE.

4. The method of claim 1, wherein the deployment configuration includes information identifying at least one of:
   a cell location of a neighboring BS of the one or more neighboring BSs,
   a cell range of the neighboring BS,
   an interference characteristic relating to a cell associated with the neighboring BS, or
   a beam coverage relating to the cell.

5. The method of claim 1, wherein transmitting the information identifying the set of beams comprises:
   transmitting information identifying a provisioned route beam list that includes information identifying a set of cells and one or more beams in each cell of the set of cells.

6. The method of claim 1, further comprising:
   identifying a configuration for one or more mobile BSs, wherein selecting the set of beams comprises:
      selecting the set of beams based at least in part on the deployment configuration and the configuration for the one or more mobile BSs.

7. The method of claim 6, wherein the configuration for the one or more mobile BSs includes information identifying at least one of:
   a location of a mobile BS of the one or more mobile BSs, or
   a beam coverage of the mobile BS.

8. The method of claim 1, further comprising:
   communicating with the UE to perform a measurement object update procedure, and
   wherein transmitting the information identifying the set of beams comprises:

transmitting the information identifying the set of beams in connection with communicating with the UE to perform the measurement object update procedure.

9. The method of claim 8, wherein communicating with the UE to perform a measurement object update procedure comprises:
transmitting a measurement object to the UE,
wherein the measurement object includes information identifying at least one of:
a frequency location on which to monitor for a beam of the set of beams,
a time location with which to monitor for the beam,
a subcarrier spacing of reference signals to be measured for a beam,
a set of cell specific offsets for the set of beams,
the set of beams for evaluation, or
another set of beams to avoid evaluating.

10. The method of claim 1, wherein transmitting the information identifying the set of beams comprises:
transmitting, for relay to the UE, the information identifying the set of beams to a serving BS of the UE.

11. A method of wireless communication performed by a user equipment (UE), comprising:
receiving information identifying a set of beams for use in connection with movement along a predicted route; and
performing a set of neighbor cell measurements, in connection with movement along the predicted route, using the set of beams.

12. The method of claim 11, further comprising:
transmitting a set of sensor measurements; and
wherein receiving the information identifying the set of beams comprises:
receiving the information identifying the set of beams based at least in part on transmitting the set of sensor measurements.

13. The method of claim 11, wherein the predicted route is based at least in part on at least one of a predicted route, a predicted mobility, or a predicted direction of the UE.

14. The method of claim 11, wherein the set of beams includes at least one of:
a beam associated with stationary base station, or
a beam associated with mobile base station.

15. The method of claim 11, wherein receiving the information identifying the set of beams comprises:
receiving information identifying a provisioned route beam list that includes information identifying a set of cells and one or more beams in each cell of the set of cells.

16. The method of claim 11, further comprising:
communicating with a base station to perform a measurement object update procedure, and
wherein receiving the information identifying the set of beams comprises:
receiving the information identifying the set of beams in connection with communicating with the base station to perform the measurement object update procedure.

17. The method of claim 11, wherein receiving the information identifying the set of beams comprises:
receiving, from a serving base station, the information identifying the set of beams relayed from another base station.

18. A base station (BS) for wireless communication, comprising:
a memory; and
one or more processors configured to:

determine, for a user equipment (UE) operating in a mobility state, route information;
identify, based at least in part on the route information, a deployment configuration for one or more neighboring BSs;
select a set of beams based at least in part on the deployment configuration; and
transmit, to the UE, information identifying the set of beams based at least in part on selecting the set of beams.

19. The BS of claim 18, wherein the one or more processors are further configured to:
obtain a set of sensor measurements; and
wherein the one or more processors, when determining the route information, are configured to:
determine the route information based at least in part on the set of sensor measurements.

20. The BS of claim 18, wherein the one or more processors, when determining the route information, are configured to:
determine at least one of a predicted route, a predicted mobility, or a predicted direction of the UE.

21. The BS of claim 18, wherein the deployment configuration includes information identifying at least one of:
a cell location of a neighboring BS of the one or more neighboring BSs,
a cell range of the neighboring BS,
an interference characteristic relating to a cell associated with the neighboring BS, or
a beam coverage relating to the cell.

22. The BS of claim 18, wherein the one or more processors, when transmitting the information identifying the set of beams, are configured to:
transmit information identifying a provisioned route beam list that includes information identifying a set of cells and one or more beams in each cell of the set of cells.

23. The BS of claim 18,
wherein the one or more processors are further configured to:
identify a configuration for one or more mobile BSs; and
wherein the one or more processors, when selecting the set of beams, are configured to:
select the set of beams based at least in part on the deployment configuration and the configuration for the one or more mobile BSs.

24. The BS of claim 18, wherein the one or more processors are further configured to:
communicate with the UE to perform a measurement object update procedure, and
wherein the one or more processors, when transmitting the information identifying the set of beams, are configured to:
transmit the information identifying the set of beams in connection with communicating with the UE to perform the measurement object update procedure.

25. The BS of claim 18, wherein the one or more processors, when transmitting the information identifying the set of beams, are configured to:
transmit, for relay to the UE, the information identifying the set of beams to a serving BS of the UE.

26. A user equipment (UE) for wireless communication, comprising:
a memory; and
one or more processors configured to:

receive information identifying a set of beams for use in connection with movement along a predicted route; and perform a set of neighbor cell measurements, in connection with movement along the predicted route, using the set of beams.

27. The UE of claim 26, wherein the one or more processors are further configured to:

transmit a set of sensor measurements; and wherein the one or more processors, when receiving the information identifying the set of beams, are configured to:

receive the information identifying the set of beams based at least in part on transmitting the set of sensor measurements.

28. The UE of claim 26, wherein the predicted route is based at least in part on at least one of a predicted route, a predicted mobility, or a predicted direction of the UE.

29. The UE of claim 26, wherein the set of beams includes at least one of:

a beam associated with stationary base station, or a beam associated with mobile base station.

30. The UE of claim 26, wherein the one or more processors, when receiving the information identifying the set of beams, are configured to:

receive information identifying a provisioned route beam list that includes information identifying a set of cells and one or more beams in each cell of the set of cells.

* * * * *